(12) United States Patent
Chuang et al.

(10) Patent No.: US 11,046,022 B2
(45) Date of Patent: Jun. 29, 2021

(54) COMPOSITE MATERIAL BODY FOR IMPACT ABSORPTION AND ARTICLES COMPRISING THE BODY

(71) Applicant: Topkey Corporation, Taichung (TW)

(72) Inventors: Chih-Ming Chuang, Taichung (TW); Wan-Ting Chung, Taichung (TW); Yen-Ta Lu, Taichung (TW)

(73) Assignees: Topkey Corporation, Taichung (TW); Xiamen Keentech Composite Technology Co., Ltd., Xiamen (CN)

( * ) Notice: Subject to any disclaimer, the term of this patent is extended or adjusted under 35 U.S.C. 154(b) by 195 days.

(21) Appl. No.: 16/136,341

(22) Filed: Sep. 20, 2018

(65) Prior Publication Data
US 2019/0091943 A1 Mar. 28, 2019

(30) Foreign Application Priority Data

Sep. 22, 2017 (TW) .................. 106132693

(51) Int. Cl.
| | | |
|---|---|---|
| B32B 27/12 | (2006.01) | |
| B32B 27/32 | (2006.01) | |
| B32B 27/40 | (2006.01) | |
| B32B 27/02 | (2006.01) | |
| B29C 70/02 | (2006.01) | |
| A63B 49/10 | (2015.01) | |
| B29C 70/88 | (2006.01) | |
| B60B 5/02 | (2006.01) | |
| B60B 1/00 | (2006.01) | |
| A63B 102/04 | (2015.01) | |
| A63B 102/02 | (2015.01) | |

(52) U.S. Cl.
CPC ............ *B29C 70/023* (2013.01); *A63B 49/10* (2013.01); *B29C 70/026* (2013.01); *B29C 70/88* (2013.01); *B29C 70/887* (2013.01); *B32B 27/02* (2013.01); *B32B 27/12* (2013.01); *B32B 27/32* (2013.01); *B32B 27/40* (2013.01); *B60B 1/003* (2013.01); *B60B 5/02* (2013.01); *A63B 2102/02* (2015.10); *A63B 2102/04* (2015.10); *A63B 2209/02* (2013.01); *B60B 2360/344* (2013.01); *B60B 2360/3416* (2013.01); *B60B 2360/36* (2013.01)

(58) Field of Classification Search
CPC ..... B29C 70/023; B29C 70/028; B29C 70/88; B29C 70/887; A63B 49/10; A63B 2102/04; A63B 2209/02; A63B 2102/02; B60B 5/02; B60B 1/003; B60B 2360/36; B60B 2360/3416; B60B 2360/344; B32B 27/12; B32B 27/32; B32B 27/40; B32B 27/02
See application file for complete search history.

(56) References Cited

U.S. PATENT DOCUMENTS

2015/0017437 A1* 1/2015 Kenny ............... B29C 70/523
428/367

* cited by examiner

*Primary Examiner* — Michael C Miggins
(74) *Attorney, Agent, or Firm* — Bacon & Thomas, PLLC

(57) ABSTRACT

A composite material body (10) includes a first material layer (20) and a second material layer (30) overlapping the first material layer (20). The first material layer (20) and the second material layer (30) are wound to form a flexible and circular rod. Impact absorption is effectively improved and impact resisting strength is enhanced because energy-absorber or damping material or its composition is attached into the composite material body (10). Technical characteristics, effects and objects of this invention are achieved thereby.

4 Claims, 6 Drawing Sheets

COMPOSITE MATERIAL BODY FOR IMPACT ABSORPTION AND ARTICLES COMPRISING THE BODY

FIELD OF THE PRESENT INVENTION

This invention generally relates to a composite material body, and more particularly to a composite material body which has a property of energy absorption and an enhanced impact resisting strength.

BACKGROUND OF THE PRESENT INVENTION

Traditional wheel rims (for such as scooters, bicycles and etc.) made of carbon fibers inevitably graze the ground or have a crash while running. In order to protect riders, there are needs to design the wheel rims with a higher impact resisting strength except enhancing energy absorption of tires mounted to the wheel rim. Besides, commercially available rackets (for such as tennis, badminton and etc.) made of carbon fibers also inevitably graze the ground or have a crash while playing.

How can the wheel rims and rackets have both high energy absorption and impact resisting strength? This is the problem to be solved by this invention.

SUMMARY OF THE PRESENT INVENTION

Accordingly, this invention relates to a composite material body for energy absorption and articles comprising the body that are substantially intended to obviate one or more of the problems due to the limitations and disadvantages encountered in prior arts.

An object of this invention is to provide a composite material body. Energy absorption is effectively raised and impact resisting strength is enhanced because energy-absorption or damping material or its composition is attached into the composite material body. Technical characteristics, effects and objects of this invention are achieved thereby.

These objects are achieved by a composite material body as defined by claim 1, a wheel rim as defined by claim 5, and a racket as defined by claim 8. The dependent claims define preferred or advantageous embodiments of the composite material body, wheel rim and racket.

In order to achieve aforementioned objects, the first aspect of this invention provides a composite material body. The composite material body comprises a first material layer and a second material layer connected to the first material layer. The first material layer and the second material layer are wound to form a flexible and circular rod whose diameter is between 0.3 mm and 5.0 mm. A proportion of a whole area of the first material layer to that of a sum of the first material layer and the second material layer is between 1:1 and 1:5.

The second aspect of this invention provides a wheel rim to which the composite material body is applied. The wheel rim comprises: an annular frame having an upper arc portion, a lower arc portion and two connection portions. Two ends of each of the connection portions are respectively connected to the upper arc portion and the lower arc portion so as to define a space which is arranged around an inside of a body of the annular frame. Two wing portions, for mounting a tire therebetween, protrude from an outer peripheral wall of the upper arc portion of the annular frame and are oppositely located at two sides of the annular frame. Two composite material bodies are respectively provided at positions where the two connection portions are connected to the upper arc portion.

Preferably, the wheel rim further comprises a third material layer stuck to peripheries of the composite material bodies and received in the space of the annular frame.

The third aspect of this invention provides a racket to which the composite material body is applied. The racket comprises an annular frame having an inner arc portion and an outer arc portion connected to two ends of the inner arc portion so as to define a space which is arranged around a body of the annular frame. Two composite material bodies are respectively arranged at positions where the inner arc portion is connected to two ends of the outer arc portion of the space of the annular frame.

Preferably, the racket further comprises a third material layer received in the space of the annular frame and stuck to peripheries of the composite material bodies.

The first material layer is constituted by polycarbonate (PC), polyurethane (PU), polypropylene (PP), thermoplastic polyurethanes (TPU), polymerized siloxanes (silicone), ethylene-vinyl acetate copolymer (EVA), synthetic rubber or combination thereof.

The second material layer is constituted by carbon fiber prepreg or combination thereof.

The third material layer is constituted by thermoplastic non-woven fabric, artificial fibers, synthetic fibers, or combinations thereof.

It is to be understood that both the foregoing general description and the following detailed description are exemplary and explanatory and are intended to provide a further non-limiting explanation of the present invention as claimed.

DETAILED DESCRIPTION OF THE PRESENT INVENTION

Features and their effects of this invention will be described in detail hereinafter by means of embodiments cooperated with drawings. The same numbers respectively refer to the same or similar elements, components, articles, structure, systems, mechanism, devices, processes, steps or methods.

Figure 1:
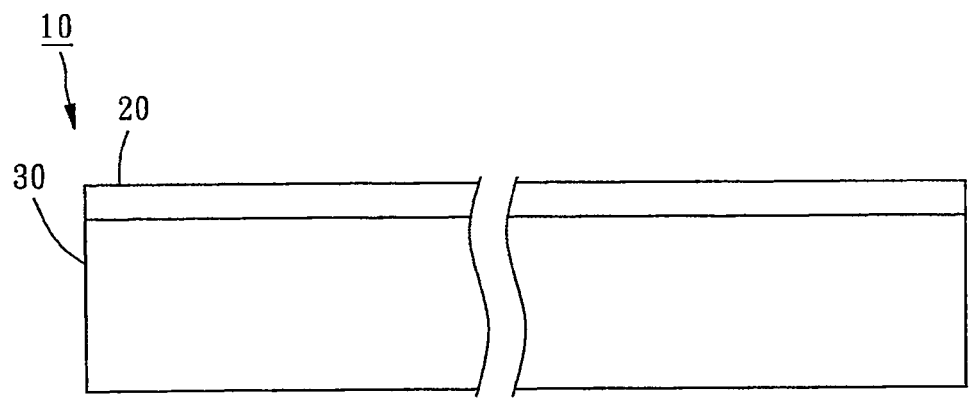
FIG. 1 is a top plan view illustrating a composite material body, which is not wound, of the first preferred embody of this invention.
Figure 2:
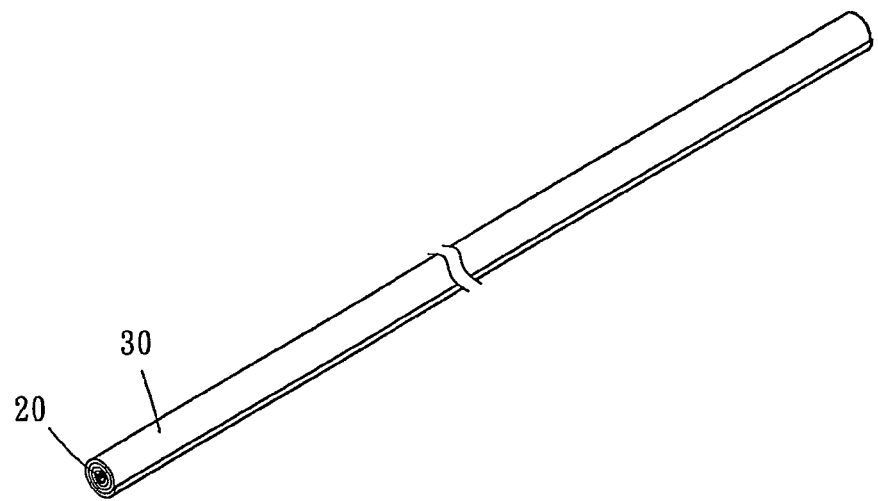
FIG. 2 is a perspective view illustrating the composite material body, which is wound, of the first preferred embody of this invention.
Figure 3:
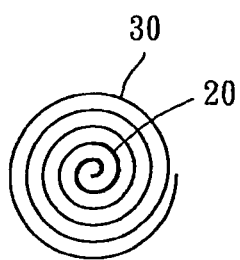
FIG. 3 a front view of FIG. 2.

FIGS. 1~3 show a composite material body 10 of the first preferred embodiment of this invention which has properties of shock absorption and enhanced impact resisting strength. The composite material body 10 may comprise a first material layer 20 and a second material layer 30 connected to the first material layer 20. The first material layer 20 and the second material layer 30 may be wound to form a flexible and circular rod. Preferably, proportion of the whole area of the first material layer 20 to that of a sum of the first material layer 20 and the second material layer 30 is between 1:1 and 1:5. Diameter of the rod may be in a range of 0.3 mm~5.0 mm.

The first material layer 20 may be overlapped or joined to a long-side edge of the second material layer 30. In this embodiment, the first material layer 20 may be constituted by synthetic rubber. Alternatively, the first material layer 20 may be constituted by polycarbonate (PC), polyurethane (PU), polypropylene (PP), thermoplastic polyurethanes (TPU), polymerized siloxanes (silicone), ethylene-vinyl acetate copolymer (EVA), or combination thereof. The second material layer 30 may be constituted by carbon fibers. Alternatively, the second material layer 30 may be constituted by fiberglass, carbon fiber prepreg, or combination thereof. Description hereinbefore does not intend to limited technical characteristics claimed by this invention.

Figure 4:
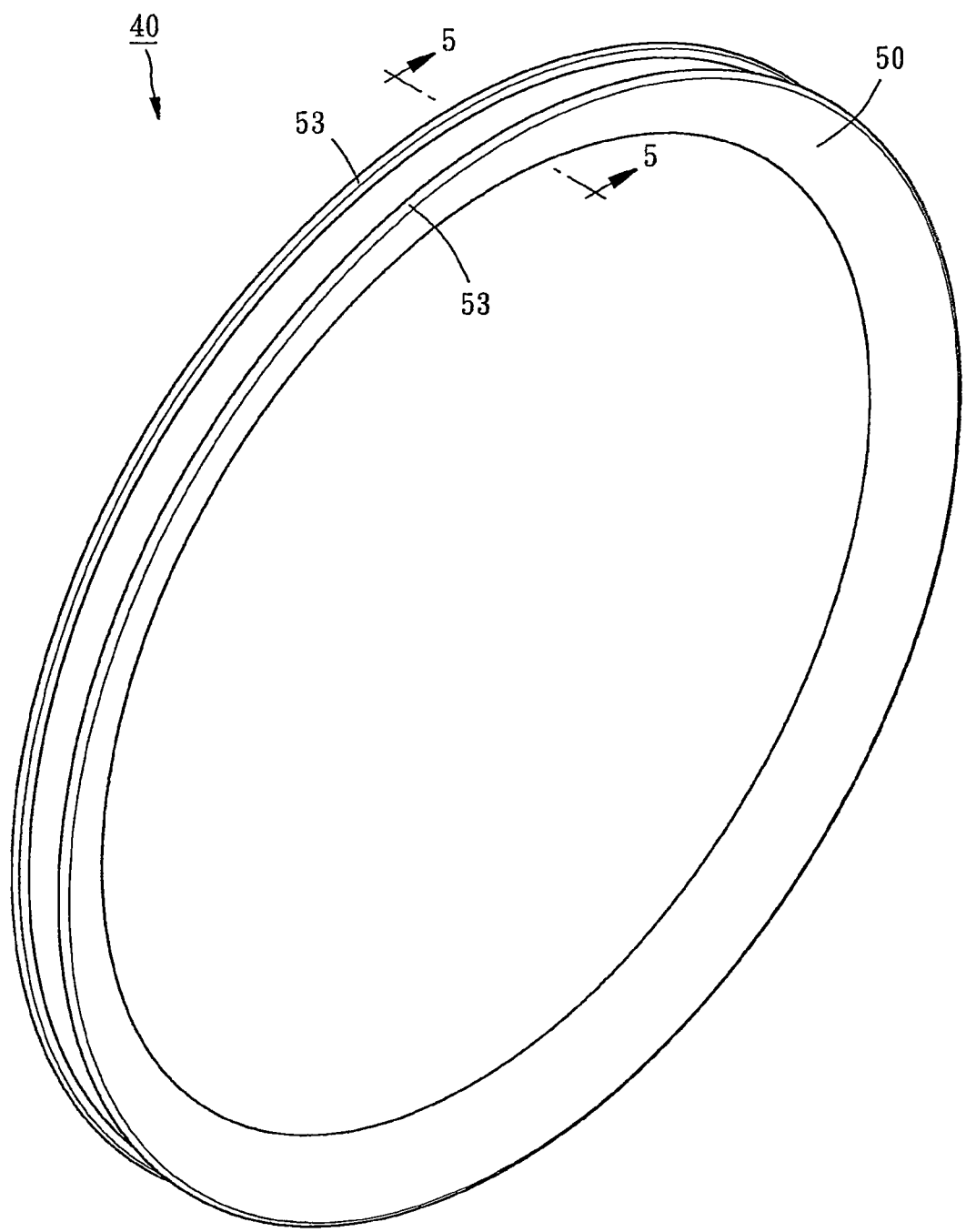
FIG. 4 a perspective view illustrating a wheel rim to which the composite material body of the first preferred embodiment of this invention is applied.
Figure 5:
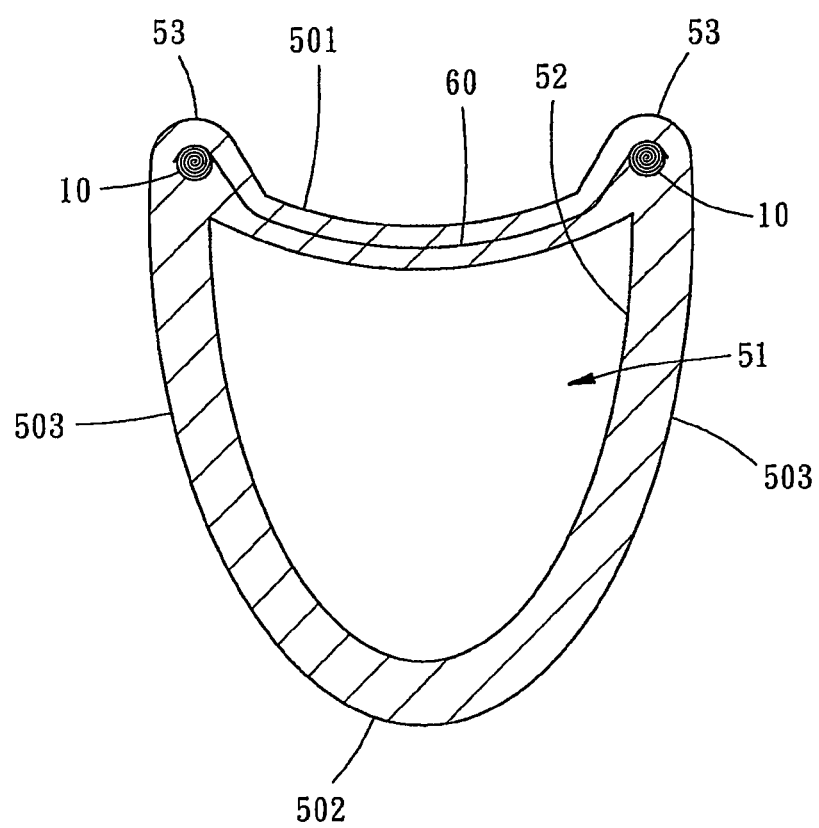
FIG. 5 is a cross-sectional view taken along line 5-5 in FIG. 4.

Also referring to FIGS. 2, 4 and 5, the composite material body 10 of the first preferred embodiment of this invention is shown and applied to a (composite) wheel rim 40 for scooters and bicycles. The wheel rim 40 may comprise two flexible rods respectively formed by winding two composite material bodies 10 and an annular frame 50.

The annular frame 50 is formed with an upper arc portion (tire bed) 501, a lower arc portion (spoke area) 502 and two connection portions 503. Two ends of each connection portion 503 are respectively connected to the upper arc portion 501 and the lower arc portion 502 so as to define a space 51. The space 51 is arranged around the inside of a body of the annular frame 50. Two wing portions 53 protrude from outer peripheral wall of the upper arc portion of the annular frame 50 and are oppositely located at two sides of the annular frame 50. A tire (not shown) may be amounted between the two wing portions 53. Two composite material bodies 10 may be respectively provided at two sides of an inner peripheral wall of the space 51 in the annular frame 50 and at positions where the two connection portions 503 are connected to the upper arc portion 501.

A third material layer 60 is stuck to peripheries of two composite material bodies 10 and received in the space 51 of the annular frame 50. The third material layer 60 is constituted by thermoplastic non-woven fabric, artificial fibers, synthetic fibers, or combinations thereof. Description hereinbefore does not intend to limited technical characteristics claimed by this invention.

Please refer to FIG. 5 again. The two flexible rods formed respectively by winding two composite material bodies 10 are first placed in the space 51 of the annular frame 50. Subsequently, the third material layer 60 is stuck to peripheries of the two composite material bodies 10. An inner peripheral wall 52 of the space 51 of the annular frame 50 is then formed by a carbon-fiber process to gradually increase its thickness such that the annular frame 50 gradually encloses the composite material bodies 10 and the third material layer 60. Description hereinbefore belongs to prior arts. Hence, its details will not be given here. Besides, description hereinbefore does not intend to limited technical characteristics claimed by this invention.

Figure 6:
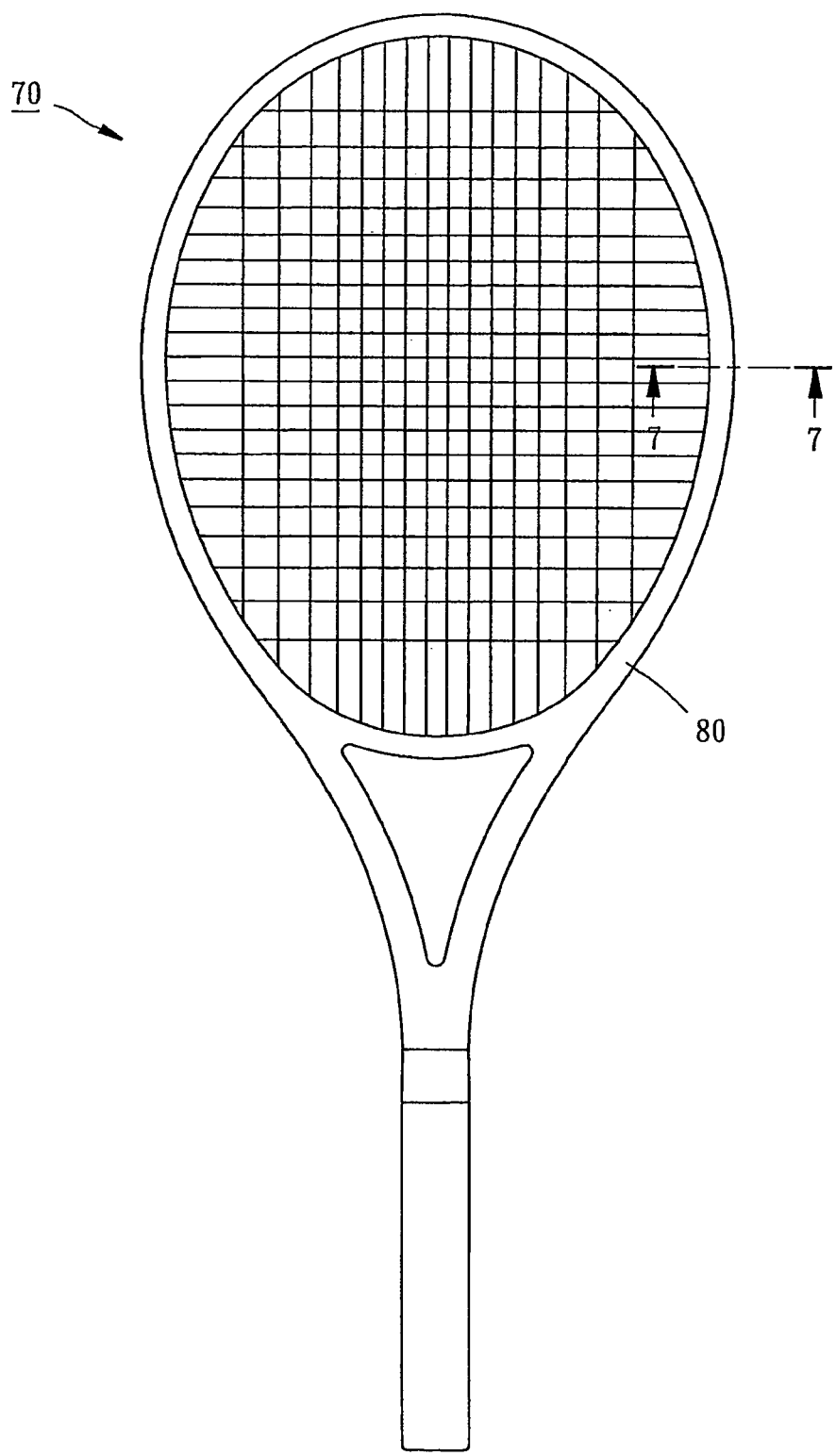
FIG. 6 a perspective view illustrating a racket to which the composite material body of the first preferred embodiment of this invention is applied.
Figure 7:
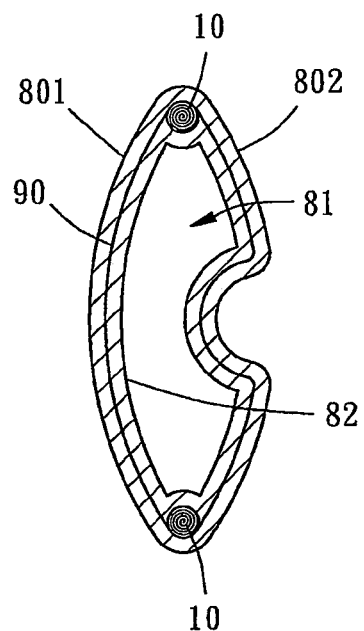
FIG. 7 is a cross-sectional view taken along line 7-7 in FIG. 6.

FIGS. 2, 6 and 7 show a racket 70 (for such as tennis, badminton and etc.) which is an application of the composite material body in the first embodiment of this invention. The racket 70 may comprise two flexible and circular rods respectively formed by winding two composite material bodies 10 and an annular frame 80.

The annular frame 80 is formed with an inner arc portion 801 and an outer arc portion 802 connected to two ends of the inner arc portion 801 so as to define a space 81. The space 81 is arranged around a body of the annular frame 80. The two composite material bodies 10 are respectively arranged at two sides of an inner peripheral wall 82 of the space 81 in the annular frame 80, and at positions where the inner arc portion 801 is connected to two ends of the outer arc portion 802.

A third material layer 90 is stuck to peripheries of the two composite material bodies 10, received in the space 81 of the annular frame 80, and surrounds the space 81. The third material layer 90 is constituted by thermoplastic non-woven fabric, artificial fibers, synthetic fibers, or combinations thereof. Description hereinbefore does not intend to limited technical characteristics claimed by this invention.

Please refer to FIG. 7 again. The two flexible rods formed respectively by winding two composite material bodies 10 are first placed in the space 81 of the annular frame 80. Subsequently, the third material layer 90 is stuck to peripheries of the two composite material bodies 10. The inner peripheral wall 82 of the space 81 in the annular frame 80 is then formed by a carbon-fiber process to gradually increase its thickness such that the annular frame 80 gradually encloses the composite material bodies 10 and the third material layer 90. Description hereinbefore belongs to prior arts. Hence, its details will not be given here. Besides, description hereinbefore does not intend to limited technical characteristics claimed by this invention.

The composite material body 10, wheel rim 40 in which the composite material body 10 is utilized, and racket 70 in which the composite material body 10 is utilized mentioned in the first embodiment of this invention can achieves the following effects.

Firstly, shock absorption of composite material body 10 is effectively raised because shocking-absorbing or resilient material or its composition is doped into the composite material body 10.

Secondly, the first material layer 20 and second material layer 30 of the composite material body 10 are overlapped or joined to each other and then wound to form a flexible and circular rod. Hence, the composite material body 10 will play an important role of dispersing forces created by a crash and thus reduce damage caused by concentration of hitting points. Therefore, impact resisting strength of the composite material body 10 can be enhanced.

Thirdly, the second material layer 30 of the composite material body 10 may be constituted by carbon fibers, fiberglass, carbon fiber prepreg, or combination thereof. Hence, the second material layer 30 and the inner peripheral wall 52 of the annular frame 50 of the wheel rim 40/inner peripheral wall 82 of the annular frame 80 of the racket 70 are materials with the same properties. Therefore, adherence of the second material layer 30 to the inner peripheral wall 52/82 is excellent such that interface with bad connection can be avoided when the composite material body 10 is integrated with the inner peripheral wall 52/82 via a carbon-fiber process.

Fourthly, sudden fracture may occur in traditional wheel rims made of carbon fibers due to high temperature or fatigue failure. When the composite material body 10 is applied in the wheel rim 40 of scooters or bicycles, accidental events may be significantly reduced at the aid of thermoplastic properties of the third material layer 60. Hence, problems having existed in traditional wheel rims made of carbon fibers may be overcome.

Fifthly, sudden fracture may occur in traditional brackets made of carbon fibers due to high temperature or impact. When the composite material body 10 is applied in the bracket 70 (for such as tennis, badminton, and etc.), accidental events may be significantly reduced at the aid of thermoplastic properties of the third material layer 90. Hence, problems having existed in traditional brackets made of carbon fibers may be overcome.

Figure 8:
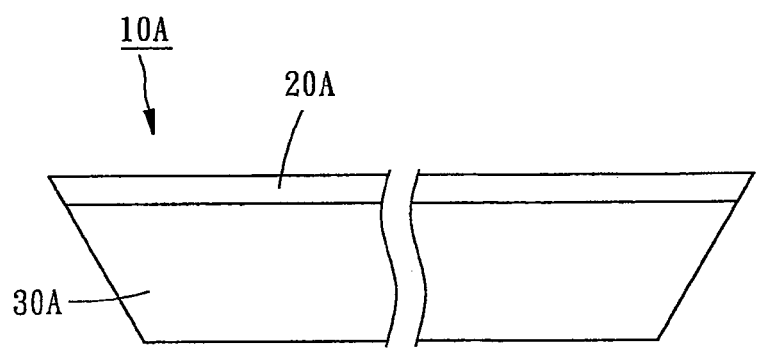
FIG. 8 is a top plan view illustrating a composite material body, which is not wound, of the second preferred embody of this invention.

FIG. 8 shows a composite material body 10A of the second preferred embodiment of this invention which has properties of shock absorption and enhanced impact resisting strength. Main structure of the composite material body 10A of the second embodiment is substantially the same as that of the first embodiment.

The composite material body 10A of the second embodiment may comprise a first material layer 20A and a second material layer 30A connected to the first material layer 20A. A long-side edge of the first material layer 20A may be overlapped or joined to that of the second material layer 30A. However, the first material layer 20A and second material layer 30A are both trapezoid.

Similarly, proportion of the whole area of the first material layer 20A to that of a sum of the first material layer 20A and the second material layer 30A is between 1:1 and 1:5. The first material layer 20A and the second material layer 30A may be wound to form a flexible and circular rod (not shown). Diameter of the rod may be in a range of 0.3 mm~5.0 mm.

It is obvious for persons who have common knowledge in technical field of this invention that detailed description and embodiments presented in this invention are merely used to describe structure, methods, processes, and etc. as well as effects to be achieved by this invention, but not to limit scopes of claims of this invention. Other substitutions or variations of equivalent elements, component, articles, structure, device, methods or processes are also covered by scopes of claims of this invention.

What is claimed is:

1. A composite material body (10) comprising:
   a first material layer (20); and
   a second material layer (30) connected to the first material layer (20);
   wherein the first material layer (20) and the second material layer (30) are connected and then wound to make the second material layer (30) to be situated outside the first material layer (20) so as to form a flexible and circular rod whose diameter is between 0.3 mm and 5.0 mm,
   wherein before the first material layer (20) and the second material layer (30) are wound, the first material layer (20) is joined to an edge of the second material layer (30), and
   wherein a proportion of a whole area of the first material layer (20) to that of a sum of the first material layer (20) and the second material layer (30) is between 1:1 and 1:5.

2. The composite material body (10) according to the claim 1, wherein the second material layer (30) is constituted by carbon fibers, fiberglass, carbon fiber prepreg or combination thereof.

3. The composite material body (10) according to the claim 1, wherein the first material layer (20) is constituted by polycarbonate (PC), polyurethane (PU), polypropylene (PP), thermoplastic polyurethanes (TPU), polymerized siloxanes (silicone), ethylene-vinyl acetate copolymer (EVA), synthetic rubber or combination thereof.

4. The composite material body (10) according to the claim 3, wherein the second material layer (30) is constituted by carbon fibers, fiberglass, carbon fiber prepreg or combination thereof.

* * * * *